Oct. 12, 1965  A. PEIS  3,211,288
APPARATUS FOR SEPARATING STONES FROM POTATOES
AND OTHER LIKE ROOT CROPS
Filed April 16, 1962

INVENTOR.
Anton Peis
BY

3,211,288
APPARATUS FOR SEPARATING STONES FROM POTATOES AND OTHER LIKE ROOT CROPS
Anton Peis, Boden, Markt, Schwaben, Germany
Filed Apr. 16, 1962, Ser. No. 187,825
Claims priority, application Germany, Apr. 18, 1961, P 26,986; July 28, 1961, P 27,625
2 Claims. (Cl. 209—78)

This invention relates to an apparatus for separating stones from potatoes or other like root crops and has application to such apparatus when combined with root crop harvesting machines.

Numerous proposals for separating stones from lifted potatoes have been made, all of which, however, have considerable disadvantages. The fundamental difficulty in separating the stones resides in that the stones and potatoes art of different sizes and of different shapes.

The difference in the specific gravity of stones and potatoes has been utilised for the purpose of separating the stones. The lifted potatoes together with the stones are fed to the top of a rotating brush roller. The potatoes do not fall deeply into the bristles of the roller as the stones and as a result leave the rotating brush roller earlier than the stones. In order to separate the stones from the potatoes, an inclined board is provided, which bears tangentially against the brush roller substantially at the level of the axis of the latter. The separation of potatoes and stones is incomplete, because the entire separating operation must take place substantially on one quarter of the periphery of the brush roller, that is to say, over a very short path, and only those stones are separated out which fall so deeply into the bristles that they pass below the aforesaid board.

Stones have also been separated by feeding the potatoes together with the stones to a conveyor belt which travels at the end to which they are fed around a horizontal guide roller and at the other end around a guide roller which is inclined to the horizontal. The potatoes are intended to roll off laterally at the delivery end owing to the inclination of the belt, while the heavier stones are intended to be discharged over the guide roller at the delivery end. Here again, the separating operation is bad because some stones, and especially round ones, roll off laterally together with the potatoes.

In the apparatus according to the invention, the potatoes and stones are delivered on to a conveyor, the belt of which has upstanding bristles of a stiffness or hardness such that only the stones penetrate between the bristles while the relatively lighter potatoes remain at the ends of the bristles and means are provided for carrying the potatoes to be removed from the belt laterally while the stones between the bristles are discharged over the end of the conveyor.

In this apparatus, surprising effective results are obtained. Owing to the length of path through which the potatoes and stones have to travel on the conveyor belt the heavier stones have sufficient time to descend into the bristles of the belt even at high operating speed. This can be assisted by a shaking movement of the belt.

Conveniently the lateral removal of the potatoes can be effected by arranging the guide roller of the belt at the end to which the potatoes and stones are delivered substantially horizontally and the guide roller at the opposite end at an inclination of the horizontal, the inclination being such that the potatoes may roll off the belt laterally.

The potatoes remain on the bristles and roll off laterally at the delivery end owing to the inclination of the belt, while the stones situated between the bristles cannot roll off laterally, but fall out only when the belt travels around the inclined guide roller. Even stones which have not descended entirely into the bristles are prevented from rolling off laterally.

Instead of or as well as inclining one of the guide rollers there may be provided at the delivery end for the purpose of laterally discharging the potatoes an inclined scraper roller provided with bristles, which rotates in the opposite direction to the travel of the belt. By means of the scraper roller, the lateral discharge of the potatoes is improved and the danger that potatoes may pass over the guide roller together with the stones is substantially completely eliminated.

So that the invention will be better understood two embodiments of it will now be described by way of example with reference to the accompanying drawings, in which.

Figure 1:
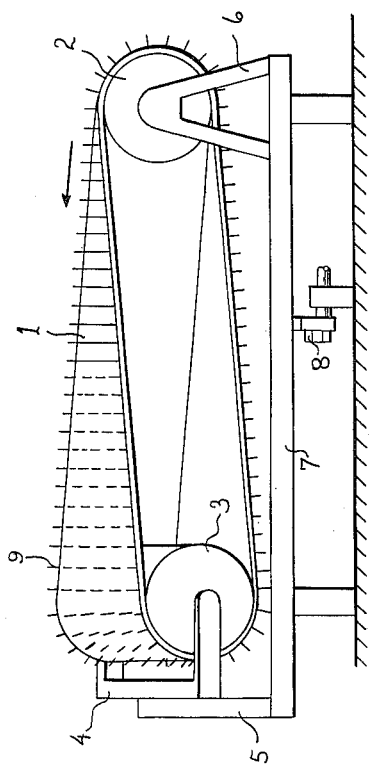
FIGURE 1 is a side elevation of one embodiment of the invention.
Figure 2:
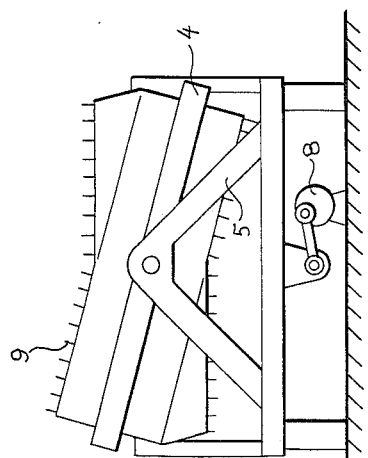
FIGURE 2 is an end elevation of the embodiment shown in FIGURE 1, showing the end from which the stones are delivered.

In the embodiment illustrated in FIGURES 1 and 2, a conveyor belt 1 travels around a horizontal guide roller 2 at the feed end for the lifted potatoes, the guide roller being at the same time the driving roller. Provided at the delivery end is an inclined guide roller 3, the shaft of which is mounted in a U-shaped frame 4, which is in turn rockably mounted on a bracket 5.

For the adjustment of the inclination of the frame 4 and thus of the guide roller 3, a spindle provided with a hand wheel (not shown) may be employed. The bracket 5 of the guide roller 3 and the bracket 6 of the guide roller 2 are fixedly mounted on a bed 7 which comprises a shaker drive 8. The actual wheel frame of the apparatus is not illustrated.

The belt 1 is provided with upright, or if desired inclined, bristles 9 which are preferably integrally formed with the belt which consists of rubber. Of course, the belt and the bristles may be made of other materials, more especially synthetic plastics.

It has been found that a suitable bristle spacing is 10 x 10 mm., with a bristle thickness of 3 mm. and a bristle height of 35 mm.

The hardness or stiffness of the bristles will, of course, depend upon the specific gravity of the stones likely to be encountered. For practical purposes the specific gravity of the stones may be assumed to be about 2.2 to 2.8 in the case of the usual types of rock. The bristles must therefore be so soft that the stones force their way between them owing to their weight, while on the other hand they must be so hard or stiff that the potatoes, whose specific gravity is only slightly above 1 and usually amounts to about 1.04, are supported by the bristles without bending or kinking.

A suitable rubber with the aforesaid bristle dimensions has proved to be an ordinary tread rubber such as is employed for automobile tyres.

In the operation of the apparatus and assuming that it is embodied in a harvesting machine, the potatoes are directed on to the belt 1 at the feed end (guide roller 2).

The potatoes lifted by the share of the potato harvesting machine are in the usual way transferred to the belt 1 after the separation of the earth and of the leaves, the upper run of the belt travelling for example, in the direction opposite to the direction of travel of the machine. As already explained, the lighter potatoes remain on the bristle face of the belt 1, while the heavier stones penetrate into the bristles. This penetration of the stones is promoted by the shaking of the belt 1 by means of the shaker drive 8.

At the delivery end of the belt which is about 1.5 m. long the transverse inclination of the belt extending substantially horizontally on the guide roller 2 is so great that the potatoes, with the assistance of the shaking movement, roll or slip laterally from the belt (forwardly in FIGURE 1 and rearwardly in FIGURE 2), while the stones are prevented from rolling off laterally because they have penetrated into the bristles, by which they are held fast, and can fall out of the bristles only when the belt 1 travels around the guide roller 3.

The slope of the guide roller 3 is so adjusted that the potatoes correctly slide off. With a length of the upper run of about 1.5 m. and a belt width of about 50 cm., an inclination or lifting of the belt edges at the guide roller 3 by about 10 cm. has proved sufficient to provide at the guide roller 3 the inclined plane necessary to cause the potatoes to roll off.

Of course, tht belt may be provided with the usual ancillary devices, for example a tensioning device, intermediate supporting rollers, and the like.

Figure 3:
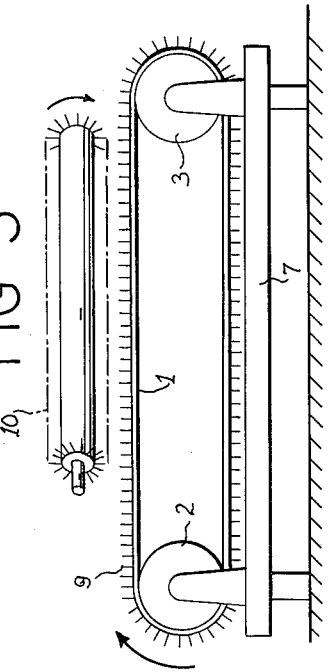
FIGURE 3 is a side elevation of an alternative construction comprising a scraper roller.
Figure 4:
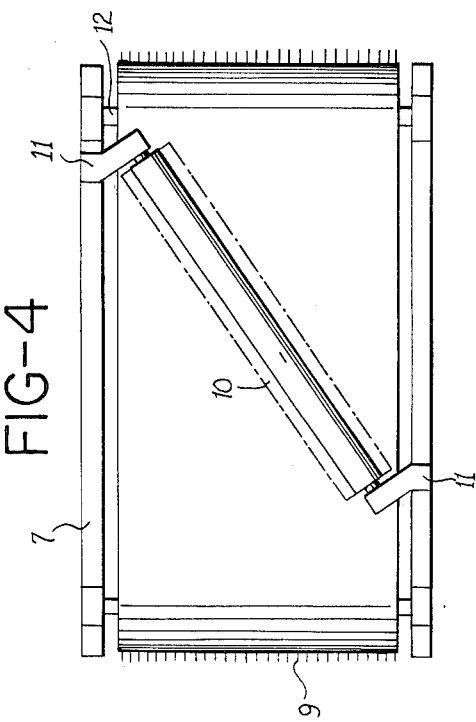
FIGURE 4 is a plan view of the embodiment shown in FIGURE 3.

In the embodiment illustrated in FIGURES 3 and 4 also, the apparatus comprises a conveyor belt 1 which travels at the feed end for the lifted potatoes around a horizontal guide roller 2, which at the same time forms the driving roller. At the delivery end, the belt travels around a further horizontally mounted guide roller 3. Both guide rollers 2 and 3 are mounted on the bed 7 of the apparatus. The actual wheel frame of the apparatus is not shown.

The belt 1 is again provided with bristles 9, which are preferably integrally formed with the belt 1, which consists of rubber.

For the lateral ejection of the potatoes from the belt 1, there is provided above the belt an inclined scraper roller 10 also having bristles, which is rotatably mounted in bearing brackets 11 (FIGURE 4) projecting upwards from the bed 7 (in FIGURE 3, these brackets have been omitted for the sake of clarity). The said scraper roller 10 rotates during operation in the direction opposite to the direction of travel of the belt 1, as indicated by the arrows in FIGURE 3.

The nature of the drive of the scraper roller is optional, and it may be effected, for example, by providing a V-belt pulley on the shaft of the guide roller 3 at the point 12 (FIGURE 4) and extending the shaft of the scraper roller 10 beyond this point 12 and here again providing it with a V-belt pulley, so that the scraper roller can be driven by means of a crossed V-belt.

The apparatus of FIGURES 3 and 4 is of very simple construction even as compared to that of FIGURES 1 and 2. The shaker drive, as employed in the construction of FIGURES 1 and 2, is unnecessary and the bed 7 for the mountings for the guide rollers 2 and 3 can be more readily produced, it being unnecessary, more especially, to provide a U-shaped frame for the inclined guide roller and a device for adjusting the inclination.

During operation of the apparatus of FIGURES 3 and 4, the potatoes are directed on to the belt 1 at the feed end (guide roller 2). The heavier stones force themselves in between the bristles 9, while the lighter potatoes remain on the bristle face of the belt 1. During the travel of the belt, the potatoes reach the scraper roller 10, which brushes them off the bristles and, by virtue of its laterally inclined position, moves them away until they fall from the belt 1.

The stones which have descended into the bristles travel under the scraper roller 10 without being taken up by the bristles thereon and fall out of the bristles of the belt 1 when the latter travels around the guide roller 3.

The scraper roller 10 is driven at such a speed that its peripheral velocity is higher than the speed of travel of the belt 1. Preferably, its peripheral velocity is about 3 times as high as the speed of the belt.

The bristles of the scraper roller are made about 80 mm. long and are spaced apart by about 10–15 mm. Soft bristles are employed, which are adapted to the hardness of the bristles of the conveyor belt. The distance between the bristle tips of the scraper roller and of the belt amounts to 5–25 mm., depending upon the size of the potatoes.

If the scraper roller is employed, it is desirable to make the bristles of the belt 1 somewhat higher than in the construction illustrated in FIGURES 1 and 2, for example 45 mm. high, and to increase the spacing somewhat, for example to about 12 mm. x 12 mm.

The apparatus of the invention can conveniently form part of a potato or root vegetable harvesting machine.

I claim:

1. A device for separating stones and potatoes in which the dug out potatoes together with the stones are delivered to the device comprising; a conveyor belt having an upper substantially horizontal reach to which the stones and potatoes are delivered at one end, spaced support rollers about which the belt passes, elastic bristle-like elements on the outer face of the belt arranged at substantially equal distances and protruding in a direction perpendicular to the surface of the belt to form a continuous field of the elements, said elastic elements being spaced apart a distance which is smaller than the average diameter of the potatoes and being resilient to a degree such that the stones on the belt will bend the elements due to the specific weight of the stones and the stones will therefore penetrate relatively freely into the field of the elements, the resilience of said elements being such that the elements are resistant to bending under the lesser specific weight of the potatoes whereby the potatoes will be carried along by the tops of the elements and are thus supported by the field of elements in such position that they can be removed from the belt separately from the stones, and means for discharging potatoes laterally from the belt to the side of the device comprising a bristled roller mounted above the belt substantially parallel thereto and inclined at an angle to the direction of movement of the belt and driven in rotation in a direction such that the side of the roller toward the belt moves in a direction opposite to the direction of movement of the belt, said bristled roller being spaced from the belt so the bristles thereof pass close by the tips of said elements.

2. A device for separating stones and potatoes in which the dug out potatoes together with the stones are delivered to the device comprising; a conveyor belt having an upper substantially horizontal reach to which the stones and potatoes are delivered at one end, spaced support rollers about which the belt passes, elastic bristle-like elements on the outer face of the belt arranged at substantially equal distances and protruding in a direction perpendicular to the surface of the belt to form a continuous field of the elements, said elastic elements being spaced apart a distance which is smaller than the average diameter of the potatoes and being resilient to a degree such that the stones on the belt will bend the elements due to the specific weight of the stones and the stones will therefore penetrate relatively freely into the field of the elements, the resilience of said elements being such that the elements are resistant to bending under the lesser specific weight of the potatoes whereby the potatoes will be carried along by the tops of the elements and are thus supported by the field of elements in such position that they can be removed from the belt separately from the stones, and means for discharging potatoes laterally from the belt to the side of the device comprising a bristled roller mounted above the belt substantially parallel thereto and inclined at an angle to the direction of movement of the belt and driven in rotation in a direction such that the side of the roller toward the belt moves in a direction opposite to the direction of movement of the belt, said bristled roller being spaced from the belt so the bristles thereof pass close by the tips of said elements, the elements of said bristled rolle rbeing spaced from each other a distance of from ten to fifteen millimeters and being about eighty millimeters long.

References Cited by the Examiner

UNITED STATES PATENTS

| | | | |
|---|---|---|---|
| 984,487 | 2/11 | Parks | 209—114 X |
| 1,426,957 | 8/22 | Chindbloom | 209—114 |
| 1,625,257 | 4/27 | Ingolfsrud | 209—114 X |
| 2,769,539 | 11/56 | Packman | 209—78 |

ROBERT B. REEVES, *Primary Examiner.*

ABRAHAM BERLIN, WILLIAM B. LABORDE,
*Examiners.*